United States Patent
Roys et al.

(10) Patent No.: US 7,972,681 B2
(45) Date of Patent: Jul. 5, 2011

(54) TEXTURED SCREEN-PRINTED LAMINATES

(75) Inventors: John E. Roys, Lowell, IN (US); Charles E. Wehmeier, Wichita, KS (US)

(73) Assignee: Avery Dennison Corporation, Pasadena, CA (US)

( * ) Notice: Subject to any disclaimer, the term of this patent is extended or adjusted under 35 U.S.C. 154(b) by 517 days.

(21) Appl. No.: 11/031,757

(22) Filed: Jan. 6, 2005

(65) Prior Publication Data

US 2005/0191470 A1 Sep. 1, 2005

Related U.S. Application Data

(60) Provisional application No. 60/534,512, filed on Jan. 6, 2004.

(51) Int. Cl.
*B41M 5/00* (2006.01)

(52) U.S. Cl. ............ 428/195.1; 264/129; 264/167; 264/265; 156/153

(58) Field of Classification Search ........ 428/195.1; 264/129, 167, 265; 156/153
See application file for complete search history.

(56) References Cited

U.S. PATENT DOCUMENTS

| | | | |
|---|---|---|---|
| 3,953,214 A | 4/1976 | Lipson et al. | |
| 4,396,448 A * | 8/1983 | Ohta et al. | 156/219 |
| 4,490,410 A * | 12/1984 | Takiyama et al. | 427/504 |
| 4,704,017 A | 11/1987 | Knapp | |
| 4,816,295 A * | 3/1989 | Cardinale | 427/510 |
| 4,897,533 A | 1/1990 | Lyszczarz | |
| 4,923,756 A | 5/1990 | Chung et al. | |
| 5,067,400 A | 11/1991 | Bezella et al. | |
| 5,114,514 A * | 5/1992 | Landis | 156/153 |
| 5,247,429 A * | 9/1993 | Iwase et al. | 362/29 |
| 5,270,097 A | 12/1993 | Amemiya et al. | |
| 5,296,340 A | 3/1994 | Tsukada et al. | |
| 5,518,786 A * | 5/1996 | Johnson et al. | 428/40.6 |
| 5,643,635 A | 7/1997 | Ahn et al. | |
| 5,701,815 A | 12/1997 | Bocko et al. | |
| 5,725,712 A | 3/1998 | Spain et al. | |
| 5,763,048 A | 6/1998 | Takahashi | |

(Continued)

FOREIGN PATENT DOCUMENTS

EP  1 247 588 A2  10/2002

(Continued)

OTHER PUBLICATIONS

Notification of Transmittal of the International Preliminary Report on Patentability; mailed Aug. 16, 2006.

(Continued)

*Primary Examiner* — Bruce H Hess
*Assistant Examiner* — Tamra L Amakwe

(57) ABSTRACT

A multi-layer laminate having a textured surface comprises a thin, flexible, thermoformable polymeric base layer, and a layer of spaced part segments of an ink material screen printed in a pattern on a surface of the polymeric base material. The ink material comprises a UV curable screen printing ink which contains a resinous binder, a hardener, and a fine particulate filler. The ink is pressed through a screen having an emulsion with a thickness from about 40 to 50 microns. The ink segments are dried on the base layer by UV curing to a height and a hardness sufficient to form a heat stable textured surface adhered to the base layer. In one embodiment, the printed ink layer has a print height from about 25 to about 50 microns and resists deformation from subsequent thermoforming and/or injection molding. The ink segments meet automotive hardness and abrasion specification requirements.

11 Claims, 3 Drawing Sheets

U.S. PATENT DOCUMENTS

| | | | |
|---|---|---|---|
| 5,928,778 A | 7/1999 | Takahashi et al. | |
| 5,948,707 A | 9/1999 | Crawley et al. | |
| 5,976,671 A | 11/1999 | Gleim | |
| 6,019,923 A * | 2/2000 | Pelzer | 264/132 |
| 6,040,044 A | 3/2000 | Takahashi et al. | |
| 6,117,384 A | 9/2000 | Laurin et al. | |
| 6,225,369 B1 * | 5/2001 | Jeon | 522/81 |
| 6,428,875 B1 | 8/2002 | Takahashi et al. | |
| 6,440,546 B1 * | 8/2002 | Fields et al. | 428/220 |
| 6,761,979 B2 | 7/2004 | Yokochi et al. | |
| 2001/0026851 A1 | 10/2001 | Hilmarcher | |
| 2003/0030172 A1 | 2/2003 | Hoogland et al. | |

FOREIGN PATENT DOCUMENTS

| | | |
|---|---|---|
| EP | 1 314 612 A1 | 5/2003 |
| GB | 1126207 | 9/1968 |
| GB | 1511241 | 5/1978 |
| JP | 60250985 | 12/1985 |
| WO | WO 03/033306 A1 | 4/2003 |
| WO | WO 2005/068187 A2 | 7/2005 |

OTHER PUBLICATIONS

International Search Report for PCT/US2006/026368 dated Nov. 23, 2006.

* cited by examiner

TEXTURED SCREEN-PRINTED LAMINATES

CROSS-REFERENCE TO RELATED APPLICATION

This application claims the benefit of U.S. provisional patent application No. 60/534,512, filed Jan. 6, 2004.

FIELD OF THE INVENTION

This invention relates to multi-layer laminates, and more particularly, to laminates and similar shaped articles having a textured surface formed by a controlled screen printing process. One application of the invention is for automotive interior laminated parts having a textured decorative surface.

BACKGROUND

Multi-layer laminates can be used in a variety of applications required to meet certain functional as well as decorative specifications. The present invention provides a multi-layer laminate having a textured surface in which the laminate is decorative in nature and typically shaped to a three dimensional configuration. Although there are outdoor weatherable applications for this particular invention, one practical use is for decorative interior automotive parts. Examples are shaped parts having a textured decorative finish that can be used for interior automotive parts such as bezels, instrument clusters, trim parts, and the like. The invention will therefore be described as it relates to interior automotive laminates.

Automotive laminates are often made with a low gloss surface. Those parts used for decorative surfacing components are particularly desirable in a low gloss finish to reduce interior glare. There are other decorative interior applications requiring a high gloss finish. U.S. Patent Publication 2003-0211334, assigned to Avery Dennison Corporation, describes a decorative and functional low gloss automotive interior laminate made from a base coat/clear coat transfer film. The film is cast on a carrier and laminated to a plastic sheet which is then thermoformed to a three dimensional shape. The carrier on which the paint layers were cast is then stripped from the laminate. The carrier has a matte release surface that can transfer a low gloss surface to the outer clear coat layer. A certain tactile property is also produced within the low gloss outer clear coat layer to impart a soft and somewhat leather-like quality to the finished surface. In this particular automotive part the chemical composition of the outer clear coat layer is adjusted to produce the desired textured surface. The outer clear coat layer contains a flatting agent dispersed in a urethane material for producing the necessary low gloss surface, which also can be shaped by thermoforming and/or molding.

The present invention provides a process for applying a textured decorative surface to an interior laminate having either a low or high gloss surface. The process involves applying a textured material in the form of a viscous ink based material to an underlying laminate by a screen printing process. The ink material, when dried and cured, produces a print pattern of sufficient height and hardness to provide a stable textured finish, one which can withstand subsequent thermoforming and molding to a three-dimensional shape.

In one embodiment, either high gloss or low gloss laminates can be formed with a textured surface using the screening process of this invention, rather than resorting to the prior art process of adjusting the chemistry of either a low gloss or a high gloss surface layer to produce a particular textured finish. A more highly textured surface also is produced by the process of this invention. In addition, the textured surface layer can meet the specification requirements for automotive parts.

SUMMARY OF THE INVENTION

Briefly, one embodiment of this invention comprises a multi-layer laminate having a textured surface comprising a thin, flexible, thermoformable polymeric base layer, and a layer of discrete spaced part segments of an ink material screen printed in a pattern on a surface of the polymeric base layer. The ink material contains a resinous binder, a hardener and a fine particulate filler. The ink segments are dried on the base layer to a height and a hardness sufficient to form a stable, heat-resistant textured surface adhered to the base layer.

In one form of the invention, the ink segments are from about 15 to about 50 microns in height. This height can be maintained without appreciable deformation when the laminate is subjected to subsequent thermoforming and/or injection molding.

Another embodiment of the invention comprises a method of forming a multi-layer laminate having a textured surface, comprising providing a thin, flexible, thermoformable polymeric base layer; and providing an ink material comprising a resinous binder containing a hardener and a fine particulate filler. The ink material is pressed through a screen onto the polymeric base layer. The screen has open areas that allow passage of the ink material so as to form a print pattern comprising segments of the ink material on the base layer. The print pattern of ink material is then dried and cured on the base layer. The segments in their dry form have a height and a harness sufficient to provide a stable, heat-resistant textured surface adhered to the polymeric base layer.

These and other aspects of the invention will be more fully understood by referring to the following detailed description and the accompanying drawings.

DETAILED DESCRIPTION

Figure 1:
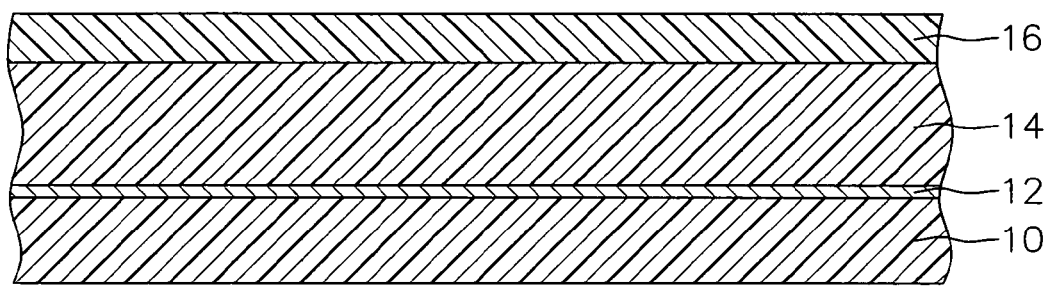
FIG. 1 is a schematic cross-sectional view illustrating a screen-printed laminate according to principles of this invention.

FIG. 1 illustrates an intermediate step in the process of making a multi-layer screen printed laminate. The laminate is made by a multi stage coating process in which various layers of the laminate are applied to a temporary carrier or casting sheet 10. The carrier can either have a high gloss surface, in which the casting sheet is used for transferring a high gloss surface to the finished laminate; or the carrier can have a matte finish for transferring a low gloss surface to the finished laminate. The embodiment illustrated in FIG. 1 represents a casting sheet 10 having a matte finish formed by a matte release coat layer 12 bonded to the carrier.

The decorative layers of the laminate are then applied to the casting sheet. In the embodiment illustrated in FIG. 1, the decorative layers comprise an outer clear coat layer 14 applied to the matte surface 12. The clear coat layer comprises a substantially transparent polymeric material, preferably comprising vinyl, acrylic, polyvinylidene fluoride/acrylic, polyurethane, fluoropolymer or ionomer resins or a combination thereof. The outer clear coat layer is dried by known techniques followed by applying a pigmented base coat or color coat layer 16 to the dried clear coat layer.

The base coat layer can comprise one or more color layers or print coat layers in various combinations well known in the art. The preferred color coat layer is made from an acrylic resinous material such as PMMA or from a more weatherable PVDF/acrylic alloy, although other resinous materials such as vinyl, urethane or ionomer resins can be used. The color coat layer can be pigmented with conventional automotive interior or exterior pigments and also can contain reflective metallic flakes. The color coat layer is dried by known techniques to form the finished intermediate laminate shown in FIG. 1.

In an alternative form of the invention the decorative laminate can comprise a monocoat paint film comprising the pigmented base coat layer without the outer clear coat layer. As mentioned, the base coat layer can comprise one or more pigmented color coat layers or print layers or combinations thereof.

The base coat/clear coat paint film layers can comprise such exterior automotive paint coat layers as those described in U.S. Pat. No. 5,725,712 to Spain, et al., assigned to Avery Dennison Corporation, or the interior laminate disclosed in Patent Publication U.S.-20003-0211334, also assigned to Avery Dennison Corporation. The disclosures of both of these patent publications are incorporated herein by reference. These publications disclose various combinations of base coat and/or base coat/clear coat paint films which can be used with the process of this invention. The '712 patent further is an example of a process for producing a high gloss base coat/clear coat finish from a high gloss carrier which may be used in certain embodiments of the present invention. The '334 patent publication illustrates use of a matte release carrier similar to that described in FIG. 1 for use in transferring a low gloss surface to other low gloss embodiments of the present invention.

FIG. 1 illustrates one example of a technique for producing a low gloss multi-layer laminate. The carrier or casting sheet 10 can comprise a flexible, foldable, heat-resistant inelastic polymeric film, such as a biaxially-oriented polyester (PET) carrier. The matte release surface 12 is preferably made by coating a thermoset chemical matte release coat on the surface of the polyester carrier. The matte release coat can comprise one or more cross-linking agents in a primary cross-linking resinous material, together with a catalyst for accelerating the cross-linking process, and a particulate filler dispersed in the matte release coat material. The matte release layer also can include release agents for use in transferring the low gloss surface to the decorative layer under heat and pressure of the transfer lamination process described below. Such a matte release coat is described, for example, in the above-cited '334 patent publication. The coating is dried or cured on the carrier sheet to form the matte release surface 12 in which the filler particles are contained at a level that can control the level of low gloss transferred to the decorative surface of the laminate.

Figure 2:
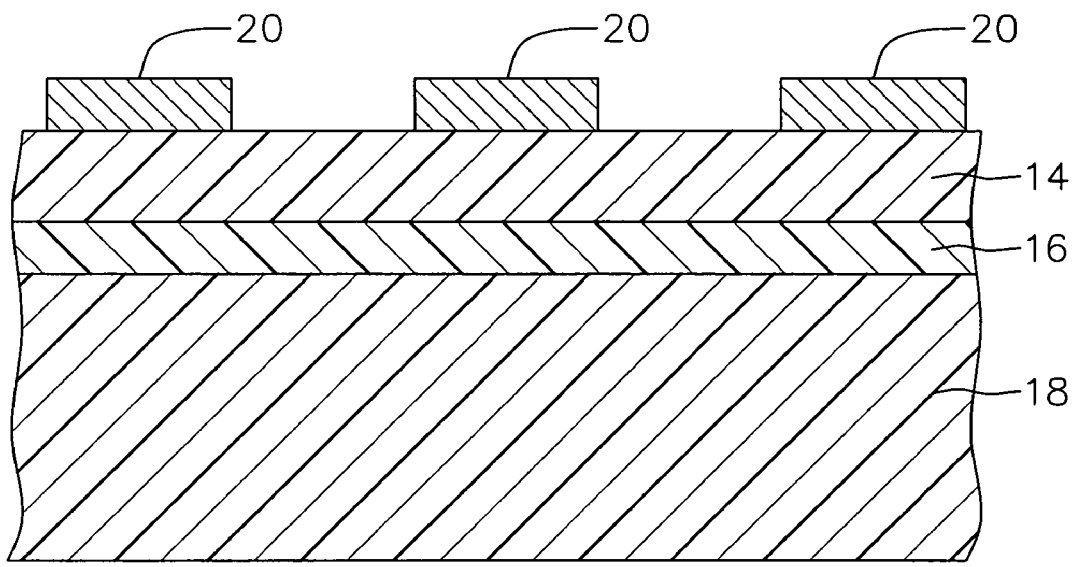
FIG. 2 is a schematic cross-sectional view illustrating one embodiment of a textured screen printed laminate which includes a base coat/clear coat paint film.

FIG. 2 shows a further intermediate step in the process in which the base coat/clear coat layer of FIG. 1 has been transfer-laminated to a thin, flexible polymeric backing sheet 18. The base coat/clear coat film is transferred under heat and pressure by techniques known in the art. The matte release layer or other carrier sheet is stripped away from the outer surface of the base coat/clear coat film during the transfer process. This leaves the finished laminate comprising the base coat/clear coat outer film, as shown in FIG. 2, bonded to the thin, flexible, polymeric backing sheet 18 by the hot roll lamination process. In one embodiment the backing sheet is made from a thermoformable polymeric material; and the sheet material can comprise a thermoplastic material. The thin, flexible backing sheet 18 can be made from typical substrate type polymeric materials such as ABS or TPO, but other polymeric materials such as polycarbonate, PETG, polypropylene, or acrylic resinous materials also can be used. A thermoformable substrate to which the decorative layer is adhered can be between 10 to 60 mils in thickness. The backing sheet layer 18 can represent such a supporting substrate sheet. Such substrate materials are typically thermoformable and can be used in an insert-mold process described below. Alternatively, the base coat/clear coat film or other decorative film can be transfer-laminated to a substrate sheet of greater thickness, say in the range from about 60 mils to about 300 mils in thickness. These substrate sheets can be thermoformable to a desired configuration and are typically used in a thick sheet lamination process not involving subsequent molding of a substrate.

Figure 3:
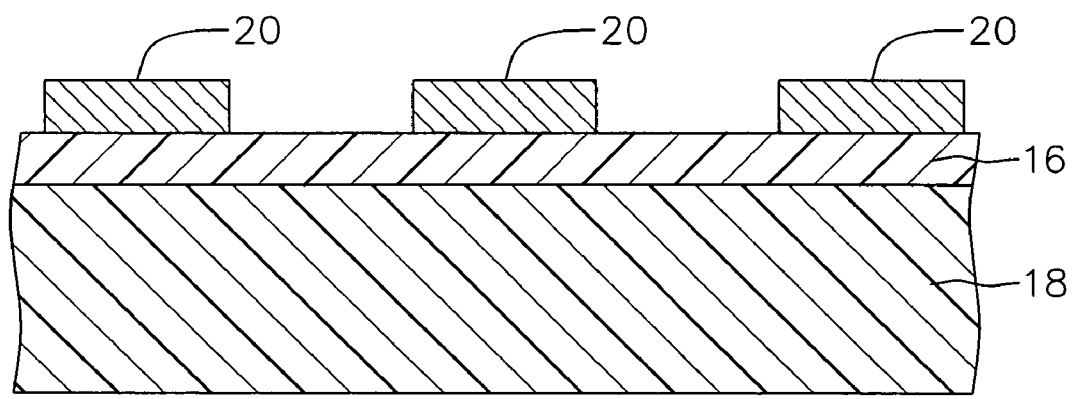
FIG. 3 is a schematic cross-sectional view illustrating an alternative embodiment of a textured screen-printed laminate in which the underlying laminate comprises a pigmented base coat layer in the absence of an outer clear coat layer.

FIG. 3 shows an alternative process in which the pigmented monocoat base coat layer 16 has been transfer-laminated to a backing sheet 18 similar to the backing sheet described previously. In this embodiment the outer clear coat layer has been omitted, and the base coat layer forms the outer surface of the decorative laminate.

In one embodiment, such as a matte PVC coated laminate having a base coat/clear coat decorative outer layer, described below, 60° surface gloss can be from about 25 to about 30 gloss units. In another embodiment, such as a matte surfaced laminate having a monocoat decorative outer layer, 60° surface gloss can be less than about 15 gloss units.

In the embodiment in FIG. 2, the outer clear coat layer 14 can have transferred to it a matte surface typically having a 60° gloss below about 30 gloss units; the outer clear coat can contain a dispersed filler to reduce gloss; or the outer clear coat layer can have transferred to it a high gloss surface typically having a 60° gloss of about 80 gloss units or more.

Similarly, in the embodiment of FIG. 3, the outer color coat can either have a low gloss matte surface by having been cast on the matte release layer; or the outer color coat layer 16 of FIG. 3 can have a high gloss outer surface, by having been cast on a high gloss polyester carrier sheet.

Following the transfer lamination step, a layer of texturizing material is applied to the outer surface of the intermediate laminate. The texturizing material comprises a discontinuous pattern of screen-printed ink formed as discrete spaced apart segments 20 on the surface of the laminate. The segments of texturizing material form the outermost surface layer of the laminates. The ink can be screen-printed in any pattern for producing discrete images forming a desired decorative or visual appearance; but the segments of the ink in their dried and cured form are also functional in the sense that they alter the character of the exterior surface so it forms a controlled texture. In the illustrated embodiment of FIG. 4, the pattern is in square segments 20 spaced apart in a uniform pattern in which the squares are in parallel rows and columns on a square grid pattern. In the illustrated embodiment, the square segments have the same spacing along each row and the same spacing along each column. In one embodiment the square segments are 500 micron-by-500 micron squares spaced apart by a 400 micron-wide separation distance along each row and along each column of squares, i.e., the ink segments cover more than 50% of the surface of the laminate.

Other ink print patterns in discrete or discontinuous segments having various geometric shapes also can be applied across the surface by the screen printing process and are within the scope of this invention.

One example of the screen printing process involves first preparing an appropriate ink base composition from a principal resin which can include conventional colorants or pigments. The preferred ink base material comprises a highly viscous heat- or radiation-curable screen printing ink. The preferred ink is a UV curable ink having a resin base matched for adhesion to the underlying sheet or coating on which it is printed. The ink system includes as additives a hardener and a fine particulate filler. The cured system of resin, hardener and filler is sufficiently thermoset to produce hardened discrete segments of the ink material bonded to the underlying polymeric substrate. The filler comprises fine particles having a hardness greater than the hardness of the resinous ink material in its dried and cured condition. One filler that is preferred is an inorganic, inert fine particulate silica-based filler, such as CAB-O-SIL, a silicate powder or fumed silica from Sericol. The preferred hardener materials are described below.

The viscous ink material is then placed on the printing screen and pushed through the screen using a normal squeegee operation to deposit the ink onto the printed surface of the laminate. The printed substrate is subjected to drying and curing conditions to harden the ink segments into the form shown in FIGS. 4 and 5. The screen is prepared with a photoreactor resin emulsion for blocking that portion of the screen through which the ink is not intended to pass, leaving the pattern elements in the unblocked or open screen areas that represent the pattern to be printed, such as a rectangular grid pattern shown in the drawings.

A preferred screen process includes placing the screen over the laminate, in which the screen has a mesh size of preferably 305 mesh, although a screen size in the range 280 up to 305 mesh can be used. The screen size can control the definition of the print coat. An emulsion is then wet-applied over the screen. The emulsion can have a layer thickness of about 20 to about 50 microns. A preferred emulsion is a 50 micron emulsion capillary which controls, in part, the height of the ink segments that have passed through the screen. A photographic positive is placed over the emulsion and exposed to high intensity light to transfer the desired pattern to the emulsion for forming the areas on the screen that will allow passage of the ink through the emulsion and onto the laminate. The UV dryer (described below) is capable of curing the ink passed through the 50 micron emulsion layer.

Figure 4:
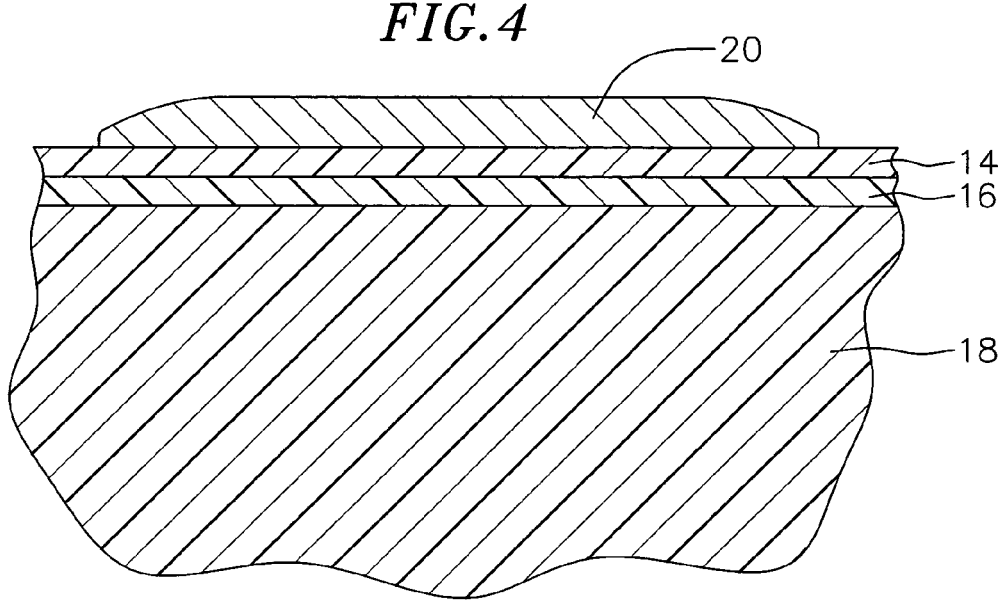
FIG. 4 is a schematic cross-sectional view illustrating an enlarged view of the screen printed ink layer of this invention adhered to an underlying substrate.
Figure 5:
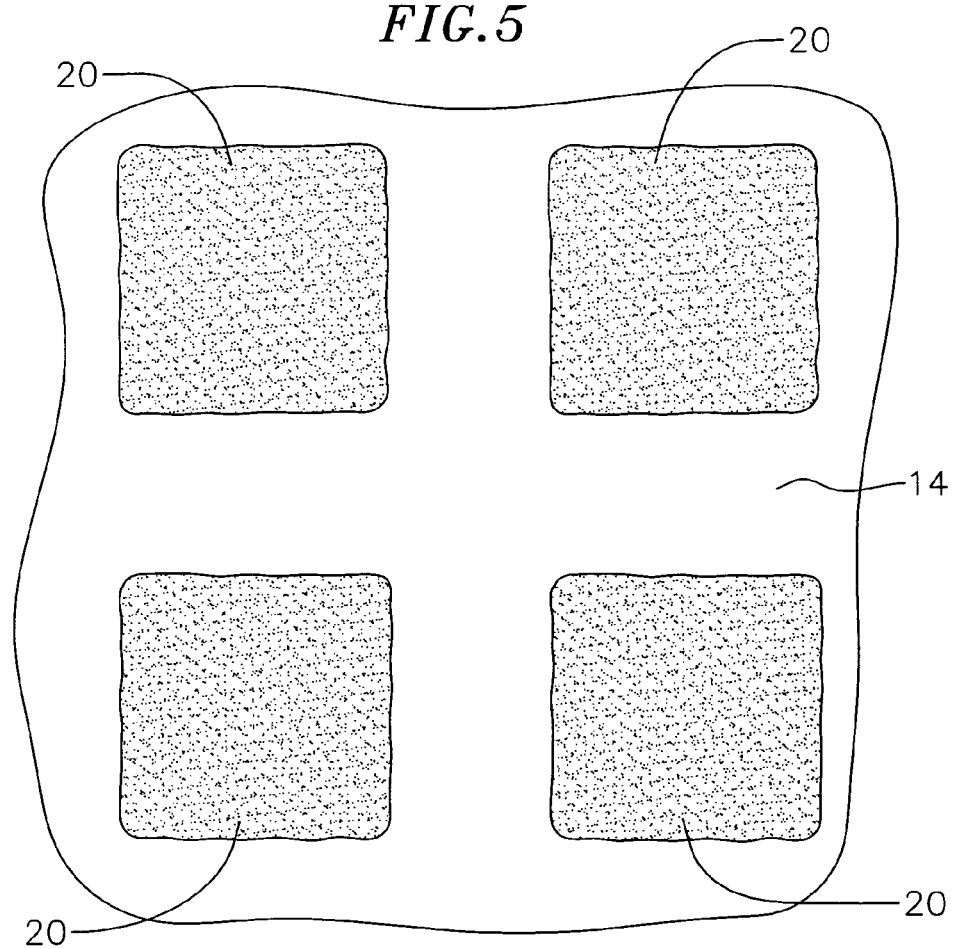
FIG. 5 is an enlarged fragmentary schematic top view showing a pattern of screen printed ink segments applied to an underlying substrate.

In one embodiment, the textured surface of the laminate is produced by creating a print height and hardness that produce, in effect, an embossed surface of controlled texture. In applications involving shaping of the final laminate, the print pattern of this invention maintains the desired print height, hardness and uniformity of the print pattern during subsequent thermoforming and/or molding steps. These aspects of the invention are produced, in part, by the formulation of the ink material which comprises the resinous ink base material, optional dispersed pigments, hardener, and fine particulate filler material. The ink dispersion is highly viscous, similar to putty; and when screen-printed in the desired print pattern it produces print segments which, in their dried, cured form, can have a height from about 15 to about 50 microns, and more preferably from about 25 to about 50 microns. In one embodiment, the print height is maintained at at least 25 microns after subsequent thermoforming. The height of the screen printed segments 20 of ink material is illustrated in FIG. 4, projected above the outer layer 14 of the decorative film.

The printing ink formulation can be adjusted depending upon the composition of the surface on which it is printed, and depending upon the desired print height. The ink composition comprises a UV curable ink. In one embodiment, the ink system comprises a pigmented UV initiated acrylic/vinyl-based ink system, such as Sericol's DCL Series inks which can be used for screen printing on a vinyl (PVC) based coating. In another embodiment, the UV curable ink system can comprise Sericol's 3-D-300 Series inks which are useful for screen printing on acrylic-based coatings including alloys of PVDF and acrylic resins. The UV curable ink system is combined with an optional further amount of dispersed pigment and with additives, including about 2% to 6% by weight hardener, such as Sericol's crosslinking hardener GSO 29673/1, and 1% to 5% by weight filler, such as Sericol's Cab-O-Sil silicate filler.

In one embodiment the hardener comprises about 5% to 6% by weight of the total ink system and the filler comprises about 2% to 3% by weight of the total ink system. The hardener enhances weatherability and the filler helps obtain the print height and adds abrasion resistance. The Sericol DCL Series ink system which contains the hardener and filler composition is useful in producing good adhesion to a vinyl-based material, together with stability and good print height for the ink segments printed on a vinyl-based substrate, such as one made of polyvinyl chloride.

In another embodiment, the printing ink formulation can comprise an acrylic-based resinous material such as Sericol's 3D-300 Series ink base resin, together with the same hardener and silicate filler at the same levels as described above. In this instance, the ink system with the added hardener and filler is useful for producing adhesion, stability and print height for the ink layer on a substrate such as one made from an alloy of PVDF/acrylic resins.

In the drying step, a sufficient amount of heat energy is necessary to thoroughly dry and cure the printed ink layer. In one embodiment, standard UV lamps comprising two 300-watt bulbs are used to produce a desired cure level of 1600 joules.

To obtain a print layer with at least 25 micron thickness after molding, a 40 to 50 micron thick emulsion layer can be used during screen printing. A less textured surface can be produced using a thinner emulsion layer. For instance, a 20 micron emulsion can produce at least a 10 micron print height after molding.

The printed ink segments have a sufficient hardness level in their thermoset condition to maintain stability and resist any appreciable deformation during subsequent thermoforming and/or injection molding. Hardness of the ink layer can be measured by pencil hardness on the scale that progresses from a softness in the B range up to a hardness in the H range. A minimum hardness is about 2B, and textured print surfaces can be produced according to the present invention with a hardness in the range from about 2B up to about HB.

The pencil hardness test is carried out by determining when surface deformation or a pencil mark occurs using a series of pencils to test hardness ranging from the B series up to within the H series.

Figure 6:
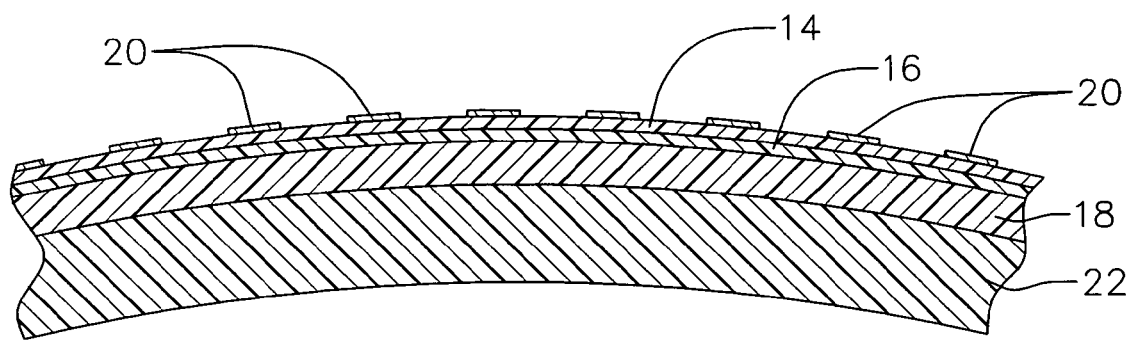
FIG. 6 is a schematic cross-sectional view illustrating a three-dimensionally shaped laminate having a molded substrate with a textured surface according to principles of this invention.

The laminate of this invention maintains its textured surface throughout subsequent thermoforming and injection-molding steps. In one embodiment, the laminate can be thermoformed to sheet temperatures ranging from about 290° to 360° F. and still maintain the print height of the ink layer pattern. The laminate also can be subjected to subsequent injection molding to form the substrate layer 22, as shown in FIG. 6, typically by the insert-mold process. The laminate, which includes the backing sheet 18, is initially thermoformed to the desired shape and then placed in an injection mold for subsequently injection molding the substrate material 22 which bonds to the reverse side of the thermoformed backing sheet. Typical molding temperatures can range from about 450° to 500° F. for resins such as ABS and from a lower temperature range of about 370° F. and higher for resins such as TPO. The molding process can subject the print layer to temperatures in the range of 80° to 100° F., and in this temperature range the stability of the print layer is maintained.

Following the screen printing process the screen printed laminate, i.e., decorate layer and backing sheet, is then thermoformed to a finished three dimensional shape; or the laminate can be first thermoformed to a desired shape and then placed in an injection mold for molding a polymeric substrate material to the backing sheet side of the laminate, via the insert-mold process.

The screen printed ink material of this invention maintains a stable print height and hardness during subsequent thermoforming and molding. In one embodiment the final print height is at least about 90% of the original print height following thermoforming and/or molding.

EXAMPLES

The following examples show embodiments (in Examples 1 to 3) in which the screen printed textured surface was applied to a vinyl decorative outer film layer. Examples 4 and 5 show subsequent embodiments in which the screen printed textured surface was applied to a decorative surface made of a different polymeric material, in this case an alloy of PVDF and acrylic resins. The examples show that the ink formulations are adjusted to match the particular polymeric composition of the decorate surface in order to maintain the desired print height while producing the necessary adhesion between the ink segments and the laminate. Test samples made according to formulations described in the examples have produced textured laminates with stable heat-resistant and abrasion-resistant print patterns maintaining a print height of greater than 25 microns and meeting interior automotive specifications for hardness, abrasion resistance, adhesion, weatherability, moisture and acid resistance and thermal resistance. The following examples disclose parts by weight for each formulation.

Example 1

A screen-printed laminate having a base coat/clear coat decorative layer was prepared from the following formulations. The backing sheet was 19 mil ABS. The color coat was a 0.4 mil acrylic ink with reflective flakes. The clear coat was a 1.0 mil matte PVC which contained an added filler to reduce gloss. The ink layer was a UV curable ink screen-printed with 400 micron spacing between a square grid pattern of 500×500 micron squares and was dried and cured to a print height of 40 microns.

|  | Parts |
|---|---|
| Black Textured Screen Print Ink | |
| UV curable ink—Halftone—Sericol DCL-LVX | 56.27 |
| Opaque black pigment—Sericol DCL-301 | 36.59 |
| Hardener—Sericol GSO 29673/1 | 5.12 |
| Silicate filler—Sericol CAB-O-SIL | 2.02 |
| Matte PVC Clear Coat | |
| PVC—450FG-Geon | 66.0 |
| Plasticizer—P-7048-C.P. Hall | 23.7 |
| UV Absorber—Tinuvin 900-Ciba | 1.3 |
| Ba Zn heat stabilizer—TC 1159SF—Ferro | 1.3 |
| ESO plasticizer—V7170-Atofina | 4.5 |
| Silica filler—Syloid 74X6000—W.R. Grace | 3.2 |
| Pigmented Base Coat | |
| PMMA—Elvacite 2042—Lucite Intl | 86.8 |
| UV Absorber—Sanduvor 3050—Sandoz | 2.2 |
| HALS (UV absorber)—Sanduvor 3206—Sandoz | 2.2 |
| Aluminum Flakes—Metalure—Avery | 2.8 |
| Pigments—Gibraltar | 6.1 |

Example 2

A screen-printed laminate having a base coat/clear coat decorative surface was prepared with the same layer thicknesses and the same PVC top coat and pigmented acrylic base coat layers as Example 1. In this example the screen print ink comprised a gray UV curable ink with the following formulation. The same print pattern as Example 1 was used and the same print height was produced.

| Gray Textured Screen Print Ink | Parts |
|---|---|
| Halftone ink—Sericol DCL-LVX | 56.27 |
| Opaque white pigment—Sericol DCL-311 | 24.98 |
| Black pigment—Sericol DCL-301 | 8.05 |
| Yellow pigment—Sericol DCL-010 | 1.19 |
| Red pigment—Sericol DCL-030 | 2.38 |
| Hardener—Sericol GSO 29673/1 | 5.12 |
| Filler—Sericol—CAB-O-SIL | 2.02 |

Example 3

A screen-printed laminate having a base coat/clear coat decorative surface was prepared with the same layer thicknesses and the same pigmented acrylic base coat layers as Examples 1 and 2. In this example the same gray textured ink formulation as Example 2 was used, and the PVC top coat comprised a high gloss outer clear coat having the following formulation. The same print pattern was used as with Examples 1 and 2.

| Gloss PVC Top Coat | Parts |
|---|---|
| PVC—450 FG | 74.4 |
| Plasticizer—7048 | 17.9 |
| UVA—Tinuvin 900 | 1.3 |
| Ba Zn Stabilizer—TC 1159SF | 1.5 |
| ESO—V7170 | 5.0 |

Example 4

A screen printed laminate was prepared with a backing sheet comprising 19 mil ABS, a 0.4 mil PVDF/acrylic base coat, a 1.0 mil PVDF/acrylic clear top coat, and a screen printed ink layer with 400 micron spacing between a square grid pattern of 500×500 micron squares. The ink layer was a UV curable ink having the following formulation:

|  | Parts |
|---|---|
| Black Screen Print Ink | |
| UV curable ink—Opaque black - Sericol 3-D 301 | 93 |
| Hardener—Sericol GSO 29673/1 | 5 |
| Silicate filler—CAB-O-SIL | 2 |
| Gloss Clear Top Coat | |
| PVDF—Kynar 500—Atofina | 61.6 |
| PMMA—Elvacite 2042 | 36.7 |
| Dispersing aid—Solsperse 17000 | 0.2 |
| UVA—Tinuvin 900 | 2.0 |
| Pigmented Color Coat | |
| PVDF—Kynar 7201 | 72.7 |
| PMMA—Elvacite 2008 | 25.5 |
| Aluminum Flakes—Metalure | 1.8 |

Example 5

Screen printed laminates were prepared with substrates comprising 19 mil ABS and TPO and a 1.0 mil pigmented PVDF/acrylic outer color coat. The pigmented color coat had a matte surface. The screen printed ink layer comprised a black acrylic resin ink having the same formulation as Example 4.

| Pigmented Color Coat | Parts |
|---|---|
| PVDF—Kynar 500 | 54.3 |
| PMMA—Elvacite 2042 | 26.7 |
| Dispersing Aid—Solsperse 17000 | 0.2 |
| Flatener—TS100 | 1.6 |
| Flatener—Pergopak M3-Lonza | 12.5 |
| UVA—Tinuvin 900 | 1.1 |
| Pigments—Gibraltar | 3.5 |

The screen-printed textured laminates of Examples 1 through 5 were tested according to the following test procedures with the following results.

Hardness

Surface hardness was tested according to a scale progressing from softness in the B range followed by HB, F, 2H, 3H, etc. in that order toward greater hardness.

Erichsen Test Rod 318 hardness tests show that the textured laminates passed a minimum hardness of F on the hardness scale with a number 2 spring set at 3 Newtons (Nt) force.

Comparative tests were made with a non-textured laminate having the vinyl film on its surface. These tests showed a minimum hardness improvement from B to F hardness with the same vinyl film having the textured surfaces of Examples 1 through 3.

Similar hardness tests showed that the test samples passed a minimum surface hardness of HB. Additional hardness tests showed a minimum pencil hardness rating of F with the test samples of Example 4 reaching a hardness rating of H.

Abrasion Resistance

The test samples were subjected to a mechanically driven scratching device. The scratch test involved dragging a 1.0 mm diameter stylus across the textured surface at different scratch forces produced by weights varying from 5, 7, 10, 15 to 20 Nt. These tests included a rating scale of 1 to 5, with 1 being best (no scratch lines).

These tests showed that the laminates passed the following minimum scratch test values:

(1) A rating of at least 2 at 15 Nt.
(2) A rating of 1 at 10 Nt.
(3) A rating of 1 at 6 Nt.

Tape Adhesion

Adhesion tests were conducted according to ASTM D3359 standard tape test methods. The tape tests were conducted on a grid of 100 textured screen printed ink segments as described in the examples. Test specimens reached an adhesion grade of 1 (trace removal with less than 1% removed) with a 3 mm grid and 3M 898 tape and, in a separate trial, adhesion according to ASTM D3359 method B was passed for a rating of 3B or greater for a 2 mm grid and 898 tape.

Taber Mar Resistance

Test samples passed SAE J949 at 250 grams load, CS-0 wheels, 300 cycles, showing no loss of grain or color definition.

Weatherometer Exposure

Test samples passed xenon weatherometer exposure tests per SAE J 1885 for 601 kJ, for 1015 kJ and for 1240 kJ.

Thermal Resistance

Test samples were exposed to a temperature of 100° C. for 500 hours. Test samples according to Examples 4 and 5 showed very slight color change, no visible gloss or surface condition change, and 90 to 100% adhesion.

What is claimed is:

1. A multi-layer automotive laminate having a textured exterior surface comprising:
   a thin, flexible polymeric base layer wherein the base layer comprises at least one layer of automotive paint on a surface thereof, thermoformed to a three-dimensional shape; and, further comprising
   a layer of spaced part segments of an ink material screen printed in a pattern on an exterior surface of the layer of automotive paint of the polymeric base layer, the ink material containing a resinous binder comprising a heat- or radiation-curable screen-printing ink, from 2% to 6% by weight of a hardener, and from 1% to 5% by weight of a fine particulate filler, the ink segments dried and cured on the base layer to a thermoset condition in which the segments of ink material are bonded to the base layer and have a print height of greater than 25 microns and a hardness forming a stable, heat-resistant and abrasion-resistant textured exterior surface adhered to the base layer.

2. The automotive laminate according to claim 1 in which the height of the segments is in the range from more than 25 to about 50 microns.

3. The automotive laminate according to claim 1 in which the ink segments have a hardness of at least 2B on the H-B scale.

4. The automotive laminate according to claim 1 in which the polymeric base layer comprises a material selected from vinyl, urethane, acrylic, fluoropolymer and ionomer resins or blends thereof.

5. The automotive laminate according to claim 1 in which the print pattern comprises a non-continuous pattern of spaced apart segments.

6. The automotive laminate according to claim 1 in which the ink material is applied to a decorative automotive paint film having a matte surface, the decorative film comprising an exterior component of the polymeric base layer.

7. A multi-layer automotive laminate for use as an interior automotive decorative surfacing component having a textured exterior surface comprising:
- a thin, flexible polymeric base layer wherein the base layer comprises at least one layer of automotive paint on a surface thereof, thermoformed to a three-dimensional shape; and, further comprising
- a layer of spaced part segments of an ink material screen printed in a pattern on a surface of the layer of automotive paint of the polymeric layer material, the ink material consisting essentially of a resinous binder comprising a heat- or radiation-curable screen-printing ink, from 2% to 6% by weight of a thermosetting hardener, from 1% to 5% by weight of a fine particulate filler comprising fumed silica, and an optional pigment, the ink segments dried and cured to a thermoset condition on the base layer and to a print height and a hardness forming a stable, heat-resistant and abrasion resistant textured exterior surface bonded to the base layer, in which the print height of the dried and hardened segments is greater than 25 microns.

8. The automotive laminate according to claim 1 in which the printed ink segments have a hardness of at least 2B on the H-B scale.

9. The automotive laminate according to claim 1 which has been thermoformed to a three dimensional shape while maintaining a print height of from more than 25 to about 50 microns.

10. The automotive laminate according to claim 1 in which the textured surface of the laminate has a minimum hardness of F at 3 Nt on the Erichsen hardness test scale and a minimum scratch test value of 1 at 6 Nt.

11. The automotive laminate according to claim 7 in which the polymeric base layer on which the ink layer is screen printed has an exterior decorative film of automotive paint with a high gloss surface having a 60° gloss of about 80 gloss units or more.

* * * * *